United States Patent

[11] 3,552,601

| [72] | Inventors | Harold Valentine Hansen<br>Cordova;<br>Lester Carl Wolf, East Moline; Virgil<br>Robert McCumber, Moline; Robert Leroy<br>Chidester, East Moline, Ill. |
|---|---|---|
| [21] | Appl. No. | 720,950 |
| [22] | Filed | Apr. 12, 1968 |
| [45] | Patented | Jan. 5, 1971 |
| [73] | Assignee | Deere & Company<br>Moline, Ill.<br>a corporation of Delaware |

[54] SEED SELECTING MECHANISM
23 Claims, 14 Drawing Figs.

[52] U.S. Cl. .................................................. 221/219,
111/34, 111/77
[51] Int. Cl. ...................................................... B65h 3/28,
A01c 5/00
[50] Field of Search .......................................... 111/88, 77,
34, 35; 221/217, 219; 222/406, 407, 410,
345—349

[56] References Cited
UNITED STATES PATENTS

| 1,065,622 | 6/1913 | Peek ............................ | 221/219X |
| 3,308,774 | 3/1967 | Keeton ......................... | 111/77 |
| 3,348,504 | 10/1967 | Fischer ......................... | 111/34 |

FOREIGN PATENTS

| 271,495 | 3/1925 | Germany ..................... | 221/217 |

Primary Examiner—Robert E. Pulfrey
Assistant Examiner—Stephen C. Pellegrino
Attorneys—H. Vincent Horsho, Harold M. Knoth, William A. Murray and John M. Nolan ABSTRACT: A seed selecting mechanism for a planter, the mechanism having a plurality of seed selecting fingers carried by a rotatable finger holder. Each finger, when passing through a supply of seeds, engages a seed and subsequently slides it along a plate until it discharges the seed through an aperture in the plate. The seed selecting finger is provided with a seed engaging portion having two separate cell-forming portions. The surface of the plate is provided with two depressed areas which cause extra seeds engaged by the selector to drop back to the seed supply prior to discharge.

PATENTED JAN 5 1971

INVENTORS
HAROLD V. HANSEN
LESTER C. WOLF
VIRGIL R. MC CUMBER
ROBERT L. CHIDESTER

BY John C. Thompson
ATTORNEY

INVENTORS
HAROLD V. HANSEN
LESTER C. WOLF
VIRGIL R. MC CUMBER
ROBERT L. CHIDESTER

BY John L. Thompson
ATTORNEY

*INVENTORS*
HAROLD V. HANSEN
LESTER C. WOLF
VIRGIL R. MCCUMBER
ROBERT L. CHIDESTER

BY *John C. Thompson*
ATTORNEY 3,552,601

SEED SELECTING MECHANISM

FIELD OF THE INVENTION

The present invention relates generally to agricultural machinery, and more particularly to seed planters and the like wherein one or more seeds are planted in the ground at regularly spaced intervals.

DESCRIPTION OF THE PRIOR ART

When planting corn and similar crops, it is desirable that the seed be placed in the ground in uniform spacings. This is true whether the seed is planted individually (known as drilling) or in groups (known as hills). To achieve the desired results, the seeds are selected individually and then either placed individually in the ground, or grouped and then placed in the ground. To select the seeds individually, it is customary in virtually all planters to select the seed by means of a seed plate. An example of a planter of this type is shown in U.S. Pat. No. 2,647,662 to Oehler issued Aug. 4, 1953. When using this type of planter, the seed plate rotates beneath a supply of seed and the seeds drop into recesses formed on the edge of the seed plate. This type of seed selecting mechanism has not been entirely satisfactory. In this type of planter, it has been necessary to accurately grade the seed into uniform sizes for use with each type of seed plate, and also to provide a multitude of different types of seed plates for use with different seeds. If the seed is not properly graded into a uniform size and if the proper seed plate is not selected, the seed will not be uniformly selected one seed at a time. For example, if the seeds are of varying sizes, it is quite possible that two small seeds may be carried to the discharge point by a single opening in the seed plate causing two seeds to be planted when only a single may be desired. Conversely, if seed is present which is too large for the opening in the seed plate, there may be misses. Also, if the seed plate is not properly selected and has openings which are either too large or too small, there will be too many doubles, or too many misses, respectively. The problem of grading seed corn has become particularly difficult in recent years with the advent of single cross hybrids which are more irregular in size than double cross hybrids which have been used in previous years.

U.S. Pat. No. 3,308,774 to Keeton issued Mar. 14, 1967 discloses a planter which operates on a principle entirely different from the seed plate-type planters commercially available today. In the Keeton planter, the seeds are engaged by fingers and slid along a circular plate until they are ejected through a hole in the plate. The seeds are then conveyed into a furrow in the ground.

SUMMARY OF THE INVENTION

It is the general object of the present invention to provide an improved seed selecting mechanism of the type shown in the Keeton U.S. Pat. No. 3,308,774.

More particularly, it is an object of this invention to provide a seed selecting finger having a seed engaging member which is divided into relatively small and large seed engaging portions.

Another object of this invention is to provide in a seed selecting mechanism having seed engaging seeds along a plate from a seed supply to a seed discharge aperture, an improved seed remover on the face of the plate that prevents more than one seed from being retained by each of the respective fingers.

Another object of the present invention is to provide an improved seed selecting finger construction.

A still further object of the present invention is to provide an improved seed selecting finger mounting construction.

A still further object of the present invention is to provide improved means for biasing the seed engaging means of each seed selecting finger toward the plate member about which the seeds are carried.

Another object of this invention is to provide a seed selecting mechanism which can be readily manufactured.

Another object of this invention is to provide a seed selecting mechanism which is reliable in operation and is capable of selecting individual seeds from a seed supply having seeds of widely varying sizes.

These and other objects and advantages of this invention will be apparent to those skilled in the art after a consideration of the following detailed description, taken in conjunction with the accompanying drawings in which the preferred form of this invention is illustrated.

DESCRIPTION OF THE PREFERRED EMBODIMENTS

Figure 1:
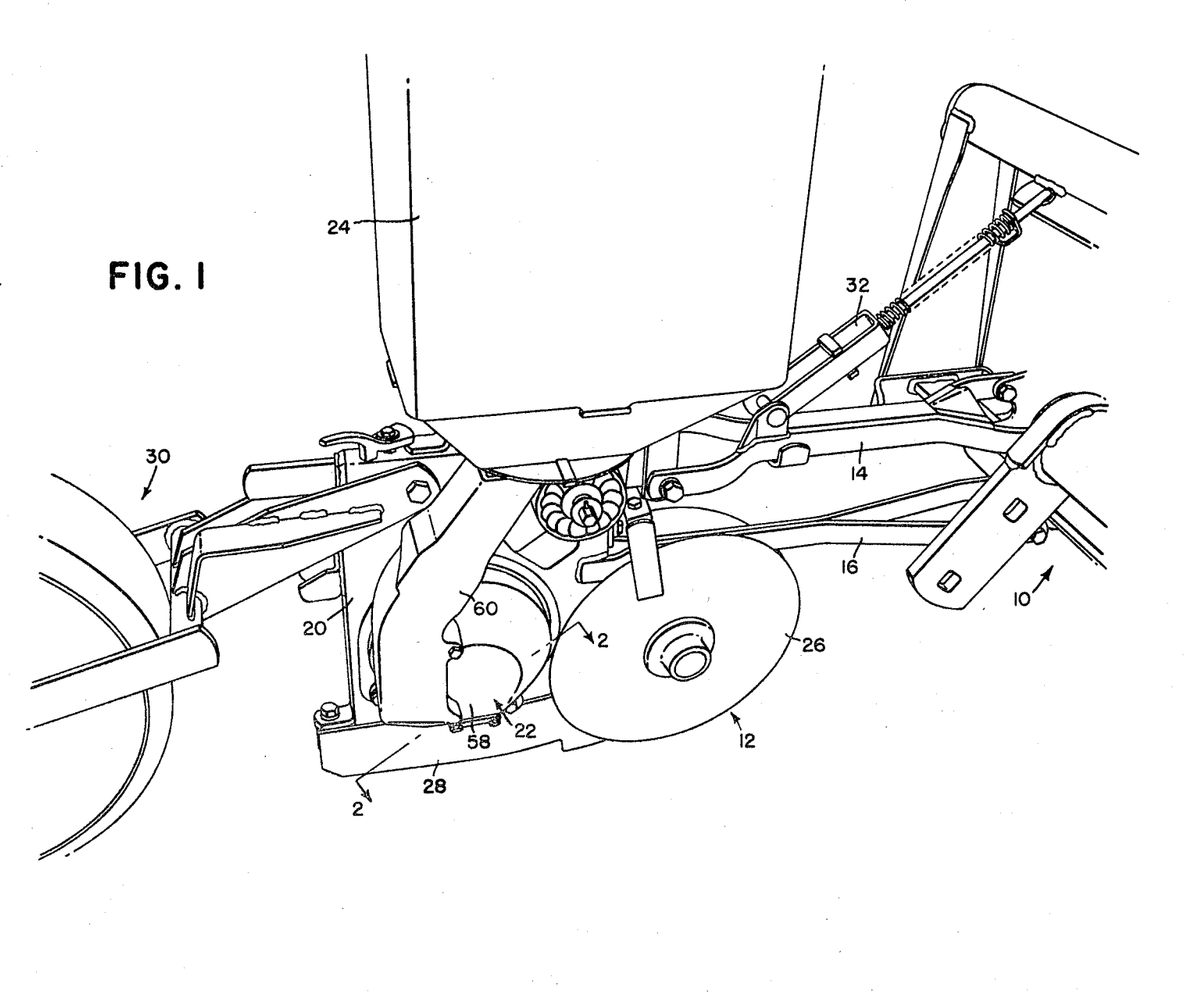
FIG. 1 is a perspective view of a portion of a planter in which the principles of the present invention are incorporated.

The seed selecting mechanism of the present invention is designed to be used with a planter of the type partially illustrated in FIG. 1. The planter includes a transversely extending frame 10 to which a plurality of planting units may be secured. Each planting unit (there being only one shown in FIG. 1) is indicated generally at 12 and includes upper and lower generally parallel links 14, 16, respectively, secured at their forward ends to the transverse frame 10. The rear ends of the upper and lower links 14 and 16 are pivotally secured to a supporting structure 20 in a manner which is not material to the present invention. The supporting structure 20 carries the seed selecting mechanism of the present invention, indicated generally at 22, as well as a principal seed hopper 24, a double disc opener 26, a runner 28, and a press wheel 30. The structure 20 includes a pair of spaced apart plates 21a, 21b, the plate 21a being provided with an aperture which receives the seed selecting mechanism 22. The transverse frame 10 is adapted to be raised and lowered by ground-engaging wheel means, not shown, and the down pressure of the openers 26, 28 of the planter unit 12 is adjusted through the spring link 32.

Figure 2:
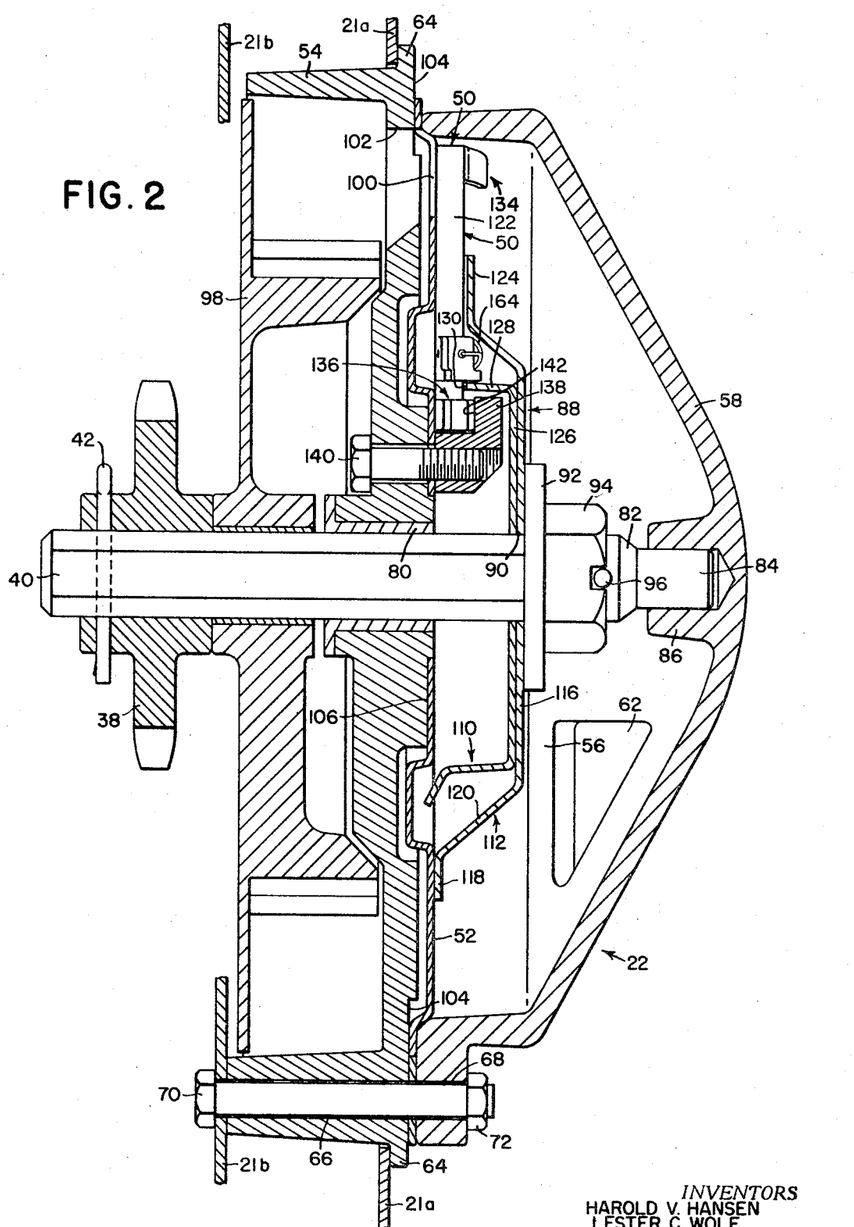
FIG. 2 is a section taken along the lines 2-2 in FIG. 1.

The seed selecting mechanism is driven by a chain which is mounted with one end over a sprocket mounted on a transversely extending jackshaft carried on the frame 10. The jackshaft may be driven from the ground-engaging wheels which support the planter frame, or in the alternative, it may be driven through a hydraulic motor. If the jackshaft is driven from a hydraulic motor, it is desirable to provide control means so that the speed of the jackshaft may be proportionately adjusted relative to the ground speed of the planter. Additional drive means in the form of chains and sprockets are provided, the final chain driving sprocket 38 (FIG. 2) which is secured to a hexagonal seed selecting drive shaft 40 by cotter pin 42.

The seed selecting mechanism 22 has seed selecting means in the form of a plurality of seed selecting fingers, indicated generally at 50, which are mounted adjacent a stationary wear plate 52 carried by a main frame member 54. The seed selecting fingers 50 engage seed in a seed supply area 56 formed in a lower portion of an auxiliary hopper 58 which also acts as a cover for the finger pickup mechanism. The auxiliary hopper 58 receives seeds from the principal seed hopper 24 through tubular means 60 which terminates in the lower portion of the cover 58. The cover 58 is apertured at 62 (FIG. 2) to receive the seeds from the tube 60. By having the aperture only in the lower portion of the cover 58, the seeds are prevented from contacting an upper surface of the plate 52. However, there will always be a sufficient supply of seeds in the bottom of the cover or auxiliary hopper 58 to assure that seeds will be selected by the seed selecting fingers provided, however, that there are seeds in the principal hopper 24.

The main frame member 54 is provided with a flange 64 which overlies the edge of the aperture in plate 21a when the main frame member is inserted within the boot 20. The main frame member is also provided with at least three apertured portions 66 and corresponding apertures 68 are provided in the cover member 58 and plate 21b for the reception of bolts 70 which pass through these apertures to secure the seed selecting mechanism 22 to the boot 20 by means of nuts 72 which cooperate with the bolts 70.

The drive shaft 40 for the seed selecting mechanism has an intermediate portion supported by a bearing 80 carried by the main frame member 54, the end 82 remote from the sprocket 38 having a reduced portion 84 which is rotatably journaled within an inwardly extending apertured lug 86 formed integrally with the cover 58.

A seed selecting finger holder indicated generally at 88 is provided with a hexagonal aperture 90 which is disposed about the drive shaft 40 so that as the drive shaft is caused to rotate the holder will rotate with it. A washer 92 is disposed about the shaft and bears against the finger guide and holder 88, the washer 92 being held from outward movement by a nut 94 and pin 96.

A seed conveyor 98 is mounted on the shaft 40 for rotation therewith, the conveyor 98 receiving seeds that are discharged by the seed selecting fingers through aligned apertures 100 in wear plate 52 and aperture 102 in the main frame member 54. The details of the conveyor mechanism 98 are more fully disclosed in copending application Ser. No. 720,951, filed Apr. 12, 1969.

It has been found that the plate 52 against which the fingers 50 bear is subject to a high rate of wear. It is a feature of this invention to provide a surface member contacted by the fingers 50 which is durable, easy to manufacture, and relatively low in cost. A hardened steel surface will have the desired durability, but it is not commercially practical to form the hardened wear surface integral with the main frame member 54 as the heat treatment necessary to provide the necessary hardened surface will tend to warp the main frame member and also provide internal stresses which will shorten its life expectancy. Therefore, it is a feature of this invention to provide a hardened steel wear plate 52 which is separate from the main frame member 54. The wear plate member is formed of steel and hardened by heat treatment. The heat treatment tends to warp the plate 52. To hold it flat the surfaces 104, 106 of the main frame member are machined flat, and then the plate 52 is held flat against the flat surfaces by the cover 58. The plate 52 is spaced away from the backing member 54 except for that portion which contacts the machined surfaces 104, 106. By having the member 52 spaced away from the backing member or main frame member 54 for most of its area, it is necessary to machine only a small portion of the backing member 54.

Figure 7:
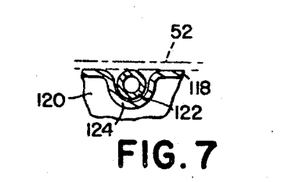

The finger guide or holder 88 is formed of inner and outer disc-shaped members 110, 112, respectively. These members are preferably spot welded together as at 114, although they may be secured to each other in any suitable fashion. As previously mentioned, the holder 88 is provided with the hexagonal opening 90, this opening being formed in both members 110, 112. The outer disc-shaped member 112 has axially spaced inner and outer radial portions 116, 118 respectively interconnected by a conical portion 120. Each of the fingers 50 is provided with an elongated cylindrical portion 122, and an outer segment of this portion is rotatably held between the outer annular portion 118 and the wear plate 52. To this end, as can best be seen from FIG. 7, the portion 118 is provided with semicylindrical recesses or bearing portions 124 which receive the cylindrical portion 122. The semicylindrical portion 124 is of such a depth that when the elongated cylindrical portion 122 of the finger 50 is disposed within it, the upper surface of the portion 122, as viewed in FIG. 7, bears against the plate 52.

Figure 6:
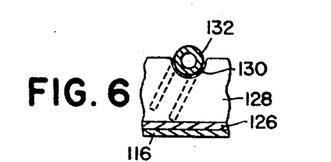
FIGS. 6, 7, and 8 are views taken along the lines 6-6, 7-7, and 8-8 in FIG. 5, FIGS. 7 and 8 showing, in broken lines, the assembled position of the plate.
Figure 8:
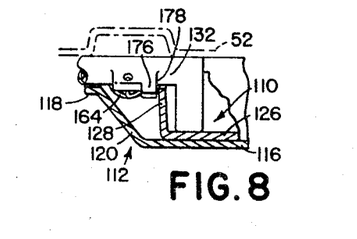

The inner disc-shaped member 110 has a planar annular portion 126 which terminates in an outer cylindrical portion 128. The cylindrical portion 128 is provided with circular notches 130 (FIG. 6) which receives an inner cylindrical portion 132 of the fingers 50, the inner portion also bearing against a portion of the plate member 52 as can be seen from FIG. 8.

From the foregoing, it can be seen that as the finger guide and holder 88 is caused to rotate by the rotation of the shaft 40, the fingers will also be rotatably moved about the wear plate 52 as they are held between the baring surfaces 124 and 130 and the plate member 52.

Each finger is formed with outer seed engaging means, indicated generally at 134, and inner cam follower means, indicated generally at 136, in addition to the elongated cylindrical portions 122, 132. Cam means 138 are secured to the main frame member 54 by cap screws 140 in the manner indicated in FIG. 2. As can be seen from FIGS. 2 and 4, the finger 50 is disposed during a portion of its rotation about the wear plate 52 with the cam follower 136 between the wear plate 52 and cam face 142 of the cam 140. During this portion of the travel of the finger, the cam face 142 will act against the face 144 of the cam follower to hold the seed engaging means 134 away from the plate 52.

Figure 3:
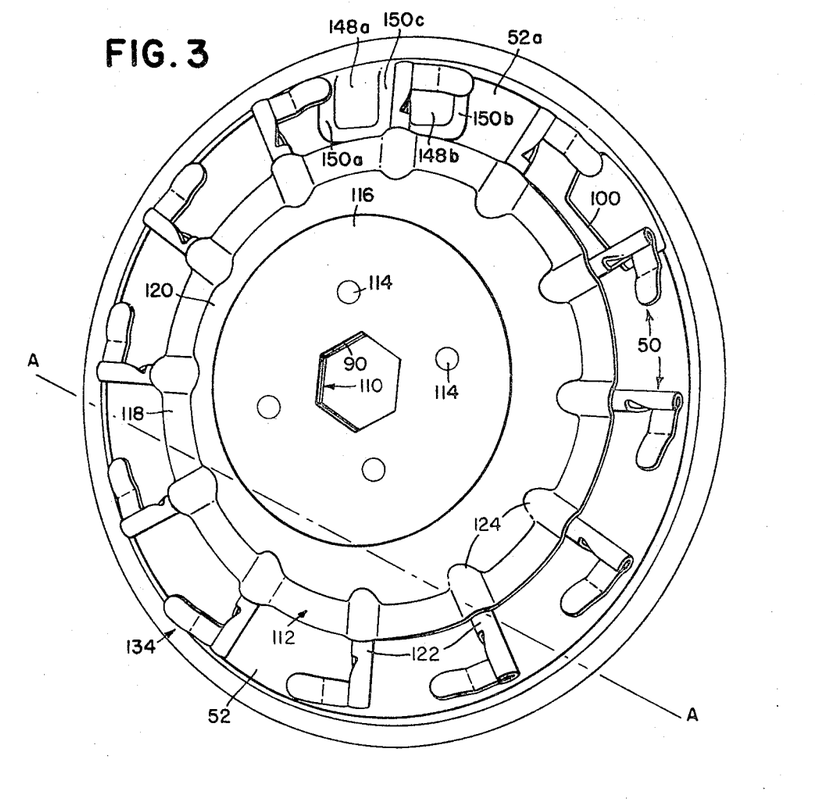
FIG. 3 is a perspective view of that portion of the seed selecting mechanism which includes a plurality of seed selecting fingers, a seed selecting finger holder, and the plate with which the seed selecting fingers cooperate.

As can be seen with reference to FIG. 3, as the seed engaging means 134 passes through the seed supply area, namely that area below the upper level of seed within the auxiliary hopper which is indicated by the line A-A, the seed engaging portion is held in an open position. As the seed engaging means of the finger passes out of the seed supply area, the cam follower 136 moves past the terminal end 146 (FIG. 4) of the cam, permitting biasing means to force the seed engaging means towards the plate 52. Seed disposed between the seed engaging means and the plate will be engaged by the seed engaging means and slid along the surface of the plate toward the aperture 100, through which the seeds will be forcibly ejected by the biasing means.

Figures 4, 4A, 10, 11, 12:
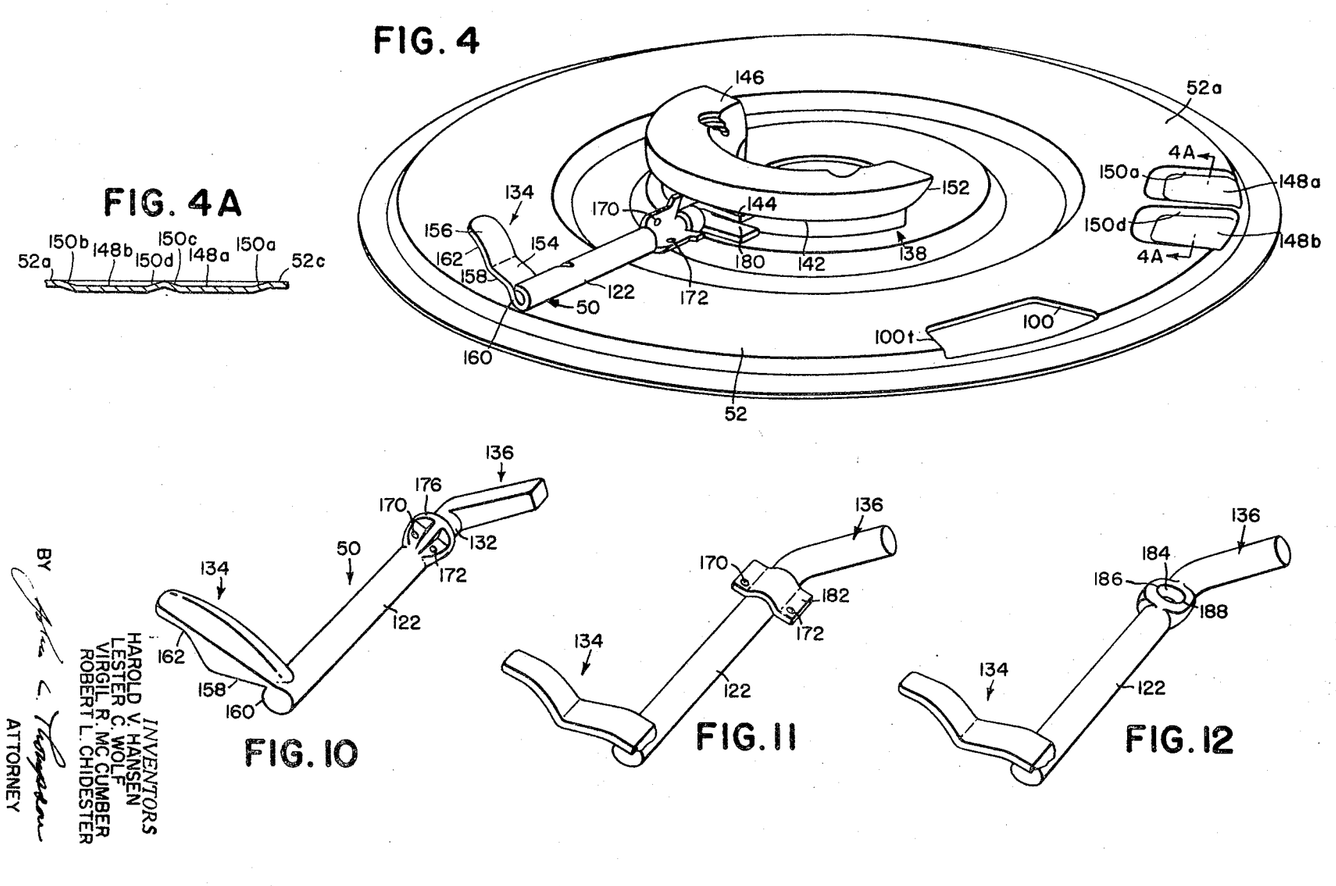
FIG. 4 is a perspective view showing a seed selecting finger in the position it would assume when passing through a seed supply.
FIG. 4A is a section taken along the line 4A-4A in FIG. 4.
FIGS. 10, 11, and 12 are perspective views of modified forms of seed selecting fingers.

Occasionally the seed engaging means 134 may hold two or more seeds against the plate and it has been found necessary to provide means for removing seed doubles from between the seed engaging means and the plate. To this end, the plate 52 is formed with two depressed or offset areas 148a and 148b. These areas are interconnected with the principal planar surface 52a of the plate 52 by inclined surfaces 150a, and 150b, there being a raised intermediate portion between the areas 148a and 148b having additional sloping surfaces 150c and 150d. This construction is best shown in FIG. 4A. Should two or more seeds be engaged by the seed engaging means 134, as the seeds pass over the areas 148a, 148b, excess seeds over one will be dislodged so that only a single seed is carried beyond the final sloping surface 150b to the aperture 100. The seeds that are dislodged fall back into the seed supply.

The biasing means force the seed engaging portion 134 partially into the aperture 100 to forcibly eject the seeds through the aperture. To prevent the forward end of the seed engaging means from engaging the terminal edge 100t of the aperture 100, the cam is so positioned that the cam follower surface 144 will be engaged by the leading ramp 152 of the cam 140 to swing the forward leading edge of the seed engaging means above the surface 52a of the member 52 as viewed in FIG. 4.

It is a feature of this invention to provide the seed engaging means 34 with a seed engaging surface formed into two cell areas capable of engaging seeds of widely varying sizes. To this end, the seed engaging means 134 is provided with a first seed engaging portion 154 (FIG. 4) and a second seed engaging portion 156. The relatively small seeds are engaged by the first seed engaging portion 154 within a concave surface 158 formed by the engaging surface 156 of the first seed engaging portion and the adjacent surface 160 of the elongated portion 118. The outer or second seed engaging portion is formed with a concave engaging surface 162. The inner edge of the concave surface 162 is disposed at an angle to the surface 158.

Figure 5:
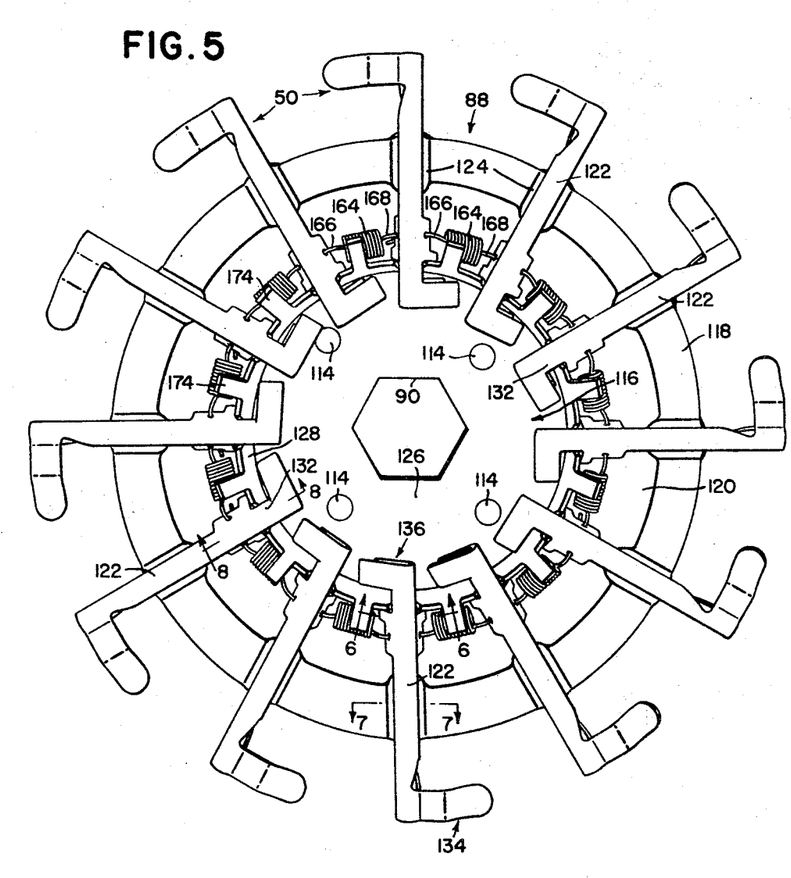
FIG. 5 is a view from one side of the seed selecting finger holder showing the manner in which the seed selecting fingers are carried by the finger holder.

Referring now to FIG. 5 in which the preferred spring biasing means is illustrated, it can be seen that a plurality of coil springs 164 are provided, between each pair of adjacent fingers with opposite ends 166 and 168 connecting portions of the respective adjacent fingers. To this end, the seed selecting finger is preferably provided with a pair of spaced apart apertures 170, 172 (FIG. 9) in diverging integral bracket portions 173, 174 respectively, the apertures being spaced radially in respect to the axis of the elongated portion to give relatively long lever arms when the apertured portions are turned out of a common plane by the action of the cam 140. The fingers are so designed so that the seed engaging portion 134 will be biased toward the plate 52 with minimal pressure. However, there will be sufficient pressure when a seed is engaged between the portion 134 and plate 52 to forcibly eject the seed through the aperture or orifice 100. The springs are normally disposed in that space between the outer cylindrical portion 128 of the inner disc-shaped member and the conical portion 120 of the outer disc-shaped member. To prevent the springs and the fingers from being dislodged from the holder 88, tabs 174 are formed on the cylindrical portion 128 and overlie the springs as can be seen from FIG. 5.

The action of the springs 164 on the fingers 50 will tend to draw the fingers 50 into the center of the holder 88. To limit inward movement, the fingers are provided with tab portions 176 (FIG. 8) having an inner bearing surface 178 which bears against the outer edge of the cylindrical portion 128.

During the operation of the seed selecting member as the cam follower 144 engages the cam ramp 152 and surface 142, the finger will be rotated about the axis of the portion 122 moving the seed engaging portion 34 axially away from the plate 52 and placing the springs which engage the apertures 170 and 172 under tension. After the cam follower 144 has passed the terminal portion 146 of the cam, the springs will act to hold the seed engaging portion tightly against any seed lodged between the portion 134 and the plate 52.

Figure 9:
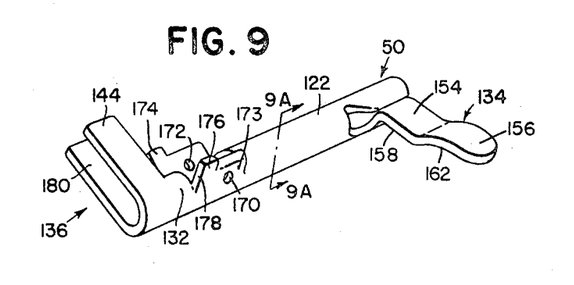
FIG. 9 is a perspective view of a preferred form of seed selecting finger.
Figure 9A:
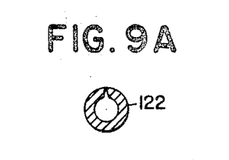
FIG. 9A is a section taken along the line 9A-9A in FIG. 9.

A preferred design of fingers is illustrated in FIG. 9. This finger is shaped from a single piece of sheet metal. The cam follower is formed of a U-shaped piece, integral with the elongated portion and having the surface 144 which engages the cam face and a second spaced apart surface 180 which engages the plate 52 to limit the rotation of movement of the finger about the axis of the cylindrical portion 122. If the additional spaced apart surface 180 is not provided it is possible during movement of the finger through the seed supply for the seed engaging portion 134 to move away from the plate to such a degree that it is not possible for the seed engaging portion 134 to bite or engage any seeds between it and the plate 52. However, if the seed selecting finger is made from bar stock, as shown in FIGS. 11 and 12, it is not necessary to provide a separate structure having the surface 180 since the thickness of the material is sufficient to limit the outward movement of the seed engaging means 134 from the plate 52. As can be seen from FIG. 9A, the elongated cylindrical portion 122 is essentially in the form of a tubular member.

Other forms of fingers are shown in FIGS. 10, 11 and 12. In FIG. 10, a seed selecting finger is shown in which the finger is formed of molded plastic. In this form, the cylindrical portion 122 is solid and the bearing surface formed by the portion 176 is continuous around the cylindrical portion 132. The apertures 170, 172 are radially offset to the sides of the axis of the cylindrical portion 122. In FIGS. 11 and 12, the cam follower 136 and cylindrical portion 122 are formed of a rod with one portion bent at an angle to the principal portion 122 to form the cam follower 136. The seed engaging portion 134 is either welded or brazed to one end of the portion 122 and, in FIG. 11, an apertured member 182 is also secured as by welding or by brazing to the portion 122 adjacent that end which has the bent out cam follower 136. In FIG. 12, the rod member is shown pierced as at 184 to form spaced apart engaging surfaces 186, 188 for the springs 164.

We claim:

1. A seed selecting mechanism comprising a housing with a seed inlet; a relatively stationary plate within the housing; seed engaging means supported within the housing biased toward and movable relative to said plate and including first and second seed engaging portions operable to engage relatively small seed and large seeds respectively so that small seeds are held by said first portion and large seeds are held by said second portion in sliding contact with the plate as said seed engaging means is moved relative to said plate and toward a seed outlet; means operable to move said seed engaging means along said plate; and an offset surface portion on said plate over which the seeds are carried by said seed engaging means, said offset surface portion being operable to dislodge extra seed from between the seed engaging means and plate if more than one seed is engaged by said seed engaging means, and said offset portion being composed of first and second areas recessed from the normal surface of the plate and sloping surfaces leading into and out of said first and second areas over which seed engaged by said seed engaging means will pass.

2. A seed selecting mechanism as set forth in claim 1 in which said seed engaging means includes a plurality of tubular members with each having an integral portion projecting from the tubular member that is deformed into said first and second seed engaging portions.

3. A seed selecting mechanism having a housing having a seed supply area and a seed discharge area; a relatively stationary plate mounted in the housing against which seeds may be held in sliding contact between a supply area and a seed discharge area; a rotatable finger support having a continuous outer edge and supported within the housing to rotate relative to the plate; a plurality of seed selecting fingers having elongated portions radially supported on the finger support and seed engaging means at the radial outer end of each of the elongated portions disposed outwardly of said edge, said fingers further having cam follower means at the inner end of each of the elongated portions, said seed engaging means and said cam follower means extending outwardly from the elongated portion; biasing means connected to and extending between adjacent fingers operable to bias the seed engaging means toward said plate, and cam means fixed within the housing to contact the cam follower means upon rotation of the finger support and operable when in contact with said cam follower means to hold the seed engaging means away from said plate.

4. In a seed selecting mechanism set forth in claim 3 in which said seed engaging means is provided with adjoining first and second seed engaging portions, said first seed engaging portion being concave with respect to the surface of said plate and disposed adjacent the elongated portion and operable to engage relatively small seed and to hold said small seed in sliding contact with the plate, said second seed engaging portion being spaced from the elongated portion and being concave with respect to the surface of said plate and operable to engage relatively large seed and to hold said large seed in sliding contact with the plate.

5. In a seed engaging means as set forth in claim 4 in which the engaging surface of the first seed engaging portion extends from and forms a concave surface with the adjacent surface of the elongated portion, the engaging surface of the second seed engaging portion is concave, and the outer end of the engaging surface of the first seed engaging portion is at an angle to the adjacent inner end of the engaging surface of the second seed engaging portion.

6. In a seed selecting mechanism as set forth in claim 3 in which said seed selecting finger is a one piece molded plastic.

7. In a seed selecting mechanism as set forth in claim 3 in which said seed selecting finger is provided with a pair of spaced apart portions engageable by said biasing means, said spaced apart portions being disposed between said seed engaging means and said cam follower.

8. In a seed selecting mechanism as set forth in claim 3 in which said elongated portion is formed of a rod, one end being bent at an angle to form said cam follower, and the other end having welded thereto said seed engaging means.

9. In a seed selecting mechanism as set forth in claim 8 in which said rod is pierced transversely between its ends to provide a pair of spaced apart portions engageable by said biasing means.

10. In a seed selecting mechanism as set forth in claim 8 further characterized by the provision of a member having spaced apart apertures engageable by said biasing means, said member being secured to said rod between its ends.

11. In a seed selecting mechanism as set forth in claim 3 in which said discharge area includes a discharge orifice and said cam means is fixed relative to said plate means with a ramp surface disposed adjacent said seen discharge orifice, whereby as said seed engaging fingers are moved past said orifice said ramp will be contacted by said cam follower means and cause said seen engaging means to move away from the plane of said plate.

12. In a seed selecting mechanism as set forth in claim 3 in which said biasing means comprises a plurality of coil springs, there being one coil spring disposed between each pair of adjacent seed selecting fingers, the ends of each coil spring being in engagement with said fingers.

13. In a seed selecting mechanism as set forth in claim 12 in which each of said seed selecting fingers is formed entirely of sheet metal, the elongated portion including a pair of spaced apart apertured tabs, said coil springs extending between tabs of adjacent fingers, the springs being provided with ends attachable in said apertures.

14. A seed selecting mechanism comprising: plate means against which seeds may be held in sliding contact between a seed supply area and a seed discharge area, a disc-shaped finger holder rotatably mounted alongside the plate means and having an inner portion axially offset from the plate means and mounted for movement relative to said plate means, a plurality of radially outwardly extending seed selecting fingers held for rotation by said holder, each of said seed selecting fingers including an elongated portion held between said holder and said plate, seed engaging means radially outwardly of the finger holder in opposed relation to the plate and fixed to the outer end of the elongated portion, and cam follower means at the inner end of the elongated portion disposed between the inner portion of the finger holder and the plate means, and cam means fixed relative to said plate means between the inner portion of the finger holder and plate means having a cam face spaced away from said plate means and engageable with the cam followers on the fingers to shift the said seed engaging means in respect to the plate.

15. In a seed selecting mechanism including circular plate means against which seeds may be held in sliding contact between a seed supply area and a seed discharge orifice, and a plurality of seed selecting fingers mounted for movement about said circular plate means with a seed engaging portion of each of the seed selecting fingers normally biased toward said circular plate means as the seed selecting finger is moved between the seed supply area and the seed discharge orifice, the improvement comprising: a plurality of angularly spaced surface offsets on the plate means in the path of the seed engaging means immediately before the seed discharge orifice, said offsets including at least two spaced apart offset surfaces lying in planes parallel to the surface of said circular plate means, said spaced apart surfaces being interconnected with each other and the surface of the plate means by sloping areas disposed in the path of the seed engaging means.

16. A seed selecting mechanism comprising: plate means having a seed discharge orifice and a surface against which seeds may be held in sliding contact between a seed supply area and the seed discharge orifice; a disc-shaped rotatable finger holder mounted to move adjacent said surface; a plurality of radially outwardly extending seed selecting fingers carried by said holder, each of said seed selecting fingers including an elongated portion, seed engaging means at one end of the elongated portion positioned radially outwardly of said holder, and cam follower means at the inner end of the elongated portion; biasing means extending between said fingers biasing the seed engaging means toward said surface, cam means fixed relative to said surface and spaced from said surface whereby said cam follower means may be disposed between said cam means and said surface, said cam means being engageable with and operable when contacted by said cam follower to hold the seed engaging means away from said surface when the seed engaging means is in said seed supply area, said cam follower being provided with two spaced apart bearing surfaces, one of said bearing surfaces being engageable by said cam means to cause the seed engaging portion to move away from the surface of the plate means as the seed engaging means passes through said supply of seeds, the other bearing surface being operable to contact the plate means to limit the distance the seed engaging portion can move away from the surface of the plate means, and means on the holder adapted to effect movement of the holder to move the seed engaging means in sequence from the seed supply area to the orifice.

17. In a seed selecting mechanism as set forth in claim 16 in which each of said seed selecting fingers is formed of sheet metal, said elongated portion being generally tubular in cross section, and said cam follower portion being generally U-shaped with spaced apart generally parallel legs, the latter having the two spaced apart bearing surfaces.

18. A seed selecting mechanism comprising: plate means having a seed discharge orifice and a surface against which seeds may be held in sliding contact between a seed supply area and the seed discharge orifice; a disc-shaped rotatable finger holder mounted to move adjacent said surface, said holder being provided with a plurality of curved inner and outer spaced apart radially aligned bearing surfaces; a plurality of radially outwardly extending seed selecting fingers carried by said holder, each of said seed selecting fingers including an elongated portion rotatably disposed within an aligned pair of bearing surfaces and in contact with said surface, seed engaging means at one end of the elongated portion positioned radially outwardly of said holder, and cam follower means at the inner end of the elongated portion; biasing means disposed in the spacing between the inner and outer bearing surfaces and extending between said fingers biasing the seed engaging means toward said surface, cam means fixed relative to said surface and engageable with and operable when contacted by said cam follower to hold the seed engaging means away from said surface when the seed engaging means is in said seed supply area, and means on the holder adapted to effect movement of the holder to move the seed engaging means in sequence from the seed supply area to the orifice.

19. In a seed selecting mechanism as set forth in claim 18 in which said finger holder is provided with a plurality of radially extending tabs extending over the space which receives the biasing means to prevent the accidental displacement of said biasing means.

20. In a seed selecting mechanism as set forth in claim 18 in which said finger is provided with engaging means extending outwardly of said elongated portion, said engaging means engaging the radial outer surface of one of said inner and outer bearing surfaces to limit inward movement of said seed selecting fingers.

21. In a seed selecting mechanism as set forth in claim 3 in which the plate is a hardened steel wear plate having an aperture at said seed discharge area and toward which the plurality of seed selecting fingers are biased to hold seed in sliding engagement with the wear plate.

22. In a seed selecting mechanism as set forth in claim 21 in which said hardened steel wear plate is provided with a pair of depressed areas in the path of said seed selecting fingers, said pair of depressed areas facilitating the removal of seed doubles.

23. A seed selecting mechanism comprising: plate means having a seed discharge orifice and a surface against which seeds may be held in sliding contact between a seed supply area and the seed discharge orifice; a disc-shaped rotatable finger holder mounted to move adjacent said surface; a plurality of radially outwardly extending seed selecting fingers carried by said holder formed entirely of sheet metal, each of said seed selecting fingers including an elongated portion having a pair of spaced apart aperture tabs, seed engaging means at one end of the elongated portion, and cam follower means at the other end of the elongated portion; biasing means comprising a plurality of coil springs, there being one coil spring disposed between each pair of adjacent fingers with each spring having ends attachable to the apertures in the respective aperture tabs and effective to bias the seed engaging means toward said surface, cam means fixed relative to said surface and engageable with and operable when contacted by said cam follower to hold the seed engaging means away from said surface when the seed engaging means is in said seed supply area, and means on the holder adapted to effect movement of the holder to move the seed engaging means in sequence from the seed supply area to the orifice.

UNITED STATES PATENT OFFICE
CERTIFICATE OF CORRECTION

Patent No. 3,552,601          Dated    5 January 1971

Inventor(s) Harold Valentine Hansen, Lester Carl Wolf, Robert McCumber and Robert Leroy Chidester It is certified that error appears in the above-identified patent and that said Letters Patent are hereby corrected as shown below:

Column 6, line 37, change "a" to -- the -- (both occ.). Column 7, line 21 and line 24, change "seen" to -- seed --; lines 46, 47 and 55, after "plate" insert -- means --.

Signed and sealed this 6th day of July 1971.

(SEAL)
Attest:

EDWARD M. FLETCHER, JR.         WILLIAM E. SCHUYLER, JR.
Attesting Officer                 Commissioner of Patents